United States Patent [19]
Sitnichenko et al.

[11] 3,932,743
[45] Jan. 13, 1976

[54] PHOTO-COPYING DEVICE

[76] Inventors: Valentin Mikhailovich Sitnichenko, ulitsa Odesskaya 58/6, kv. 14; Alexandr Mikhailovich Zamuruev, ulitsa Tereshkovoi 12, kv. 24; Andrei Isakovich Kogut, ulitsa Pionerskaya 20, kv. 12, all of Odessa, U.S.S.R.

[22] Filed: Oct. 31, 1973

[21] Appl. No.: 411,412

Related U.S. Application Data

[63] Continuation-in-part of Ser. No. 866,334, Oct. 14, 1969, abandoned.

[52] U.S. Cl.............................. 250/202; 318/577
[51] Int. Cl.² ....................................... G06K 11/02
[58] Field of Search..................... 250/202; 318/577

[56] References Cited
UNITED STATES PATENTS

| | | | |
|---|---|---|---|
| 2,521,946 | 9/1950 | Rathje | 250/202 |
| 2,853,626 | 9/1958 | Wetzel | 250/202 |
| 2,988,643 | 6/1961 | Inaba | 250/202 |
| 3,423,589 | 1/1969 | Bardwell et al. | 250/202 |
| 3,502,882 | 3/1970 | Von Voros | 250/202 |
| 3,515,877 | 6/1970 | Baxter et al. | 250/202 |

*Primary Examiner*—James W. Lawrence
*Assistant Examiner*—T. N. Grigsby
*Attorney, Agent, or Firm*—Haseltine, Lake & Waters

[57] ABSTRACT

A photo-copying device for controlling displacement of the working member of a metal gas-cutting machine following the line of the contour being copied, comprising a photoelectric transducer which provides circular scanning of the line of the contour being copied by means of an optical scanning beam for detecting the points of intersection of said beam with said contour line, the path of said beam in the contour plane being a circumference with its center lying approximately on said contour line, the optical scanning beam moves along said path at a constant angular speed and intersects said contour line at two points; a source of reference signals in the form of sine and cosine voltages; a first and a second drives for moving said photoelectric transducer along the X and Y axes, respectively; a third and a fourth drives for displacing said working member of the gas-cutting machine along its guides which are taken to be X and Y axes; a first and a second converters for converting instantaneous values of a cosine and a sine voltage of the reference signal, respectively, generated at the instants when the scanning optical beam intersects said contour line, into pulses that follow during each circular scanning period and that determine the number of equal steps of said first and second drives within each circular scanning period; said first and second converters also producing a logic symbol defining the direction of displacement of said photoelectric transducer along the X and Y axes.

1 Claim, 5 Drawing Figures

PHOTO-COPYING DEVICE

The present application is a continuation-in-part of our co-pending application No. 866,334, filed on Oct. 14, 1969 now abandoned.

The present invention relates to photo-copying devices used for controlling the displacement of the working member of gas-cutting machines.

Known in the prior art are photo-copying devices used for regulating the working member of gas-cutting machines which comprise the following functionally sequential elements: a photoelectric transducer for circular scanning of the line of the contour being copied by means of an optical scanning beam, converters of sine and cosine voltage reference signals and a photoelectric transducer signal into the signals of speed vector components of the photoelectric transducer moving along the line of the contour being copied, and drives for moving said transducer and the working member of the gas-cutting machine along the X and Y axes.

The output signal of the converter is a pulsating voltage whose envelope or mean magnitude is proportional to the speed of the photoelectric transducer moving along the X or Y axis. The polarity of the converter output voltage corresponds to the sign of the direction of photoelectric transducer displacement along one of the coordinate axes.

The known devices have the disadvantage that they must employ an inertia link in smoothing the converter output voltage. Usually, the functions of a smoothing filter are performed by the drive motors of the photoelectric transducer and the working member of the machine. However, when stepping motors are used for moving the photoelectric transducer which increases the dynamic accuracy and speed of the copying process, a smoothing filter must intentionally be included in the circuit which results in a lower response speed of the follow-up system.

It is an object of the invention to provide a fast-acting photo-copying device.

In the accomplishment of the above and other objects, there is provided a photo-copying device used for regulating the working member of a gas-cutting machine in accordance with a contour line, said device comprising a photoelectric transducer, a source of two reference signals, drives for moving said photoelectric transducer along the X and Y axes, drives for displacing the working member of the gas-cutting machine along its guides, and reference signal converters, said photoelectric transducer providing circular scanning of the contour line being copuied by means of an optical scanning beam for detecting the points at which said beam intersects said contour line, the path of said beam in the contour plane being a circumference of a circle with its center lying approximately on said contour line; said scanning beam moving along said beam path at a constant angular speed and intersecting said line at two points; the output signal of the photoelectric transducer during one scanning period being a short pulse which is generated when the scanning beam intersects the contour line being copied at one of said points; each of said converters for converting the instantaneous values of reference sine and cosine voltages comprising; a first shaper of unidirectional pulses in the form of rectified half-waves of the reference signal; a second shaper of square pulses corresponding to the polarity of reference signal half-waves; three gating circuits, the first circuit producing short pulses corresponding to the scalar values of said instantaneous magnitudes of the reference signal, and the second and third circuits giving out short pulses which symbolically define the sign of said instantaneous magnitudes of the reference signal; a converter unit for proportional conversion of the amplitudes of said short output pulses of the first gating circuit, and a memory store.

Other objects and advantages of the present invention will be more fully understood from the following description of a preferred embodiment thereof when read with reference to the accompanying drawings, in which.

Figure 1:
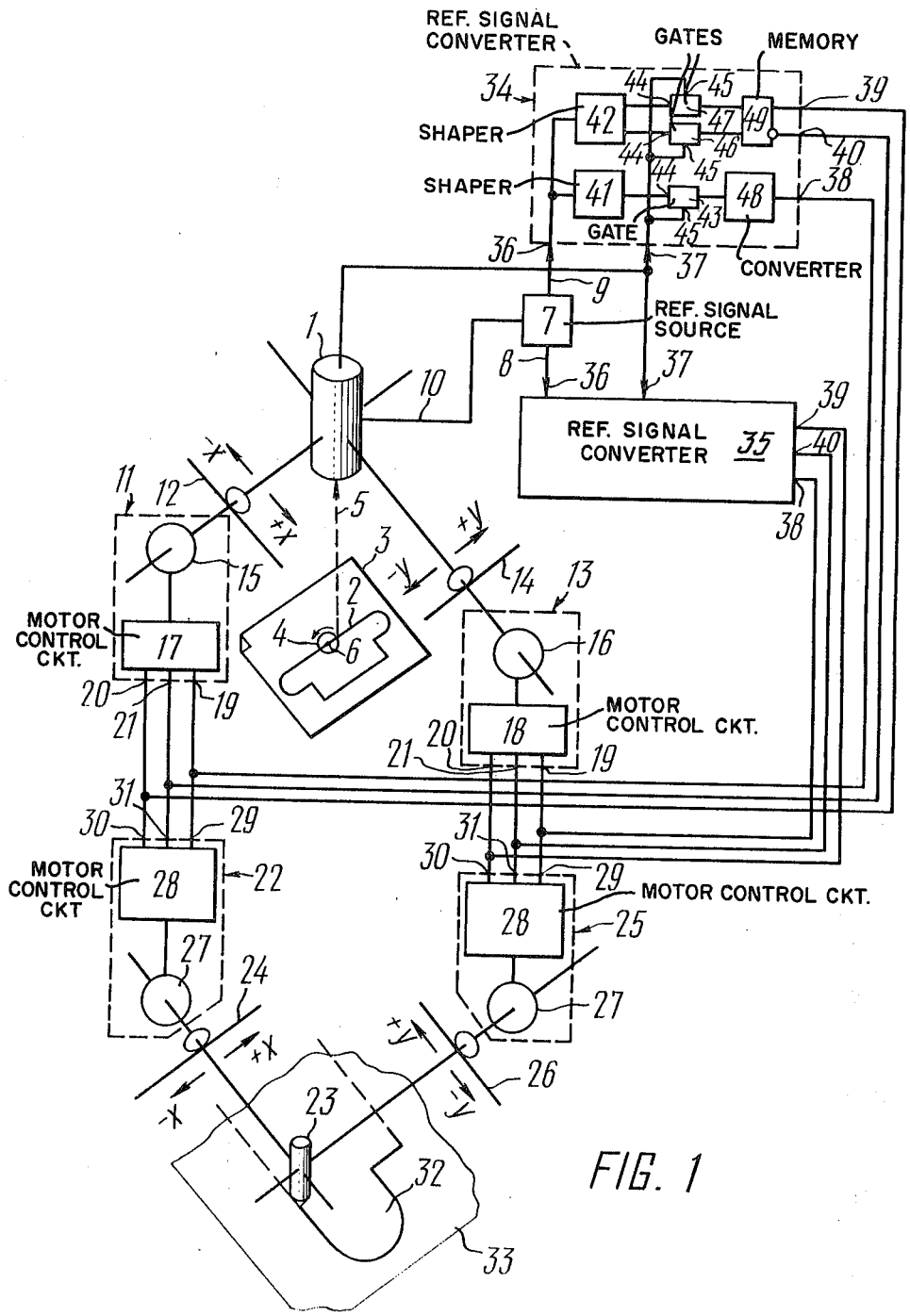
FIG. 1 is a block diagram of a photo-copying device, in accordance with the invention.

As shown in the drawing, the photo-copying device for regulating the working member of a gas-cutting machine comprises a photoelectric transducer (FIG. 1) providing circular scanning of a line 2 of a contour 3 being copied.

When the photoelectric transducer 1 is stationary, the path 4 of the scanning beam 5 in the plane of the contour 3 is a circumference of a circle with a center 6 lying approximately on the line 2 being copied.

The photo-copying device contains a source 7 of reference signals in the form of a sine voltage carried by a line 8, and a cosine voltage carried by a line 9.

The reference signal source 7 is connected by a line 10 to the photoelectric transducer 1, due to which the scanning beam 5 moves along the path 4 simultaneously and through-phase with the passage of reference signals in the line 8 and 9.

The photo-copying device comprises a first drive 11 for displacing the photoelectric transducer 1 along the X-axis by means of guides 12, and also a second drive 13 for displacing the photoelectric transducer 1 along guides 14 in the Y-axis direction in the Cartesian coordinate system.

The guides 12 and 14 of the machine are mutally perpendicular and serve as a coordinate system whose origin lies at the center 6 of the path 4, while the axes of the system are parallel to the guides 12 and 14.

The guides 12 and 14 as well as other structural components of the machine are integrated in a complex mechanical structure the details of which are not essential for an explanation of the principle of the present invention. For this reason, the mechanical construction of the machine is not shown in the accompanying drawings, and its guides 12 and 14 are represented by straight lines.

The first drive 11 and the second drive 13 incorporate actuating step motors 15 and 16 and logical units or motor control circuits 17 and 18 for controlling these motors. Each of said drives 11 and 13 has a frequency input 19 and sign inputs 20 and 21.

The photo-copying device also comprises a drive 22 which moves a working member 23 along guides 24 in the direction of the X-axis of the machine, and a drive 25 for displacing the working member 23 along guides 26 in the direction of the Y axis of the machine.

Each of the drives 22 and 24 include an actuating motor 27 and a motor control unit or circuit 28. The drives 22 and 25 have frequency inputs 29 and sign inputs 30 and 31. They insure a required scaling of the contour of a blank 32 cut out of a metal sheet 33.

The photo-copying device comprises reference signal converters 34 and 35, a converter of the reference signal source 8 and a converter of the photoelectric transducer 1 for changing the above signals into signals determining the rate of displacement of the photoelectric transducer along the line 2 being copied in the direction of the X and Y axes.

Each of said converters 34 and 35 has a first input 36 and a second input 37, a frequency output 38 and two sign outputs 39 and 40.

The frequency outputs 38 of the converter 34 are connected to the frequency inputs 20 and 30 of the drive 11 and drive 22. Similarly, the frequency output 38 of the converter 35 is connected to the frequency inputs 19 and 29 of the drives 13 and 25.

The sign outputs 39 and 40 of the converter 34 are coupled to the sign inputs 20 and 21 as well as 30 and 31 of the drive 11 and of the drive 22. The sign outputs of the converter 35 are similarly coupled to the identical inputs of the converters 13 and 25 corresponding to the Y-axis.

Each of the converters 34 and 35 contains a first shaper 41 which produces unidirectional pulses in the form of rectified waves of a sine voltage, and a second shaper 42 forming square pulses with polarities corresponding to those of the same half-waves. The parallel inputs of said shapers 41 and 42 are supplied by the first input 36 of the converter 34, and the first input 36 of the converter 35.

Each of the converters 34 and 35 also comprises a gating circuit 43 with its functional input 44 connected to the output of the first shaper 41, a gating circuit 46 with the functional input 44 thereof coupled to the first inverted output of the second shaper 42, and a gating circuit 47 whose functional input 44 is connected to the second inverted output of the second shaper 42. Parallel gating inputs 45 of the gating circuits 43, 46 and 47 form the second input 37 of the converter 34 (35).

Each of the converters 34 and 35 contains a converter unit 48 for converting the short pulse amplitudes into a proportional number of higher-frequency pulses with the input thereof connected to the output of the gating circuit 43 and the output forming the converter frequency output 38.

Each of the converters 34 and 35 comprises a memory store 49 whose unity input is connected to the output of the gating circuit 46 and the zero input, to the output of the gating circuit 47. The zero output and the unity output of the memory store 49 form the sign outputs 40 and 39 of the converter 34 (35).

Figure 2:
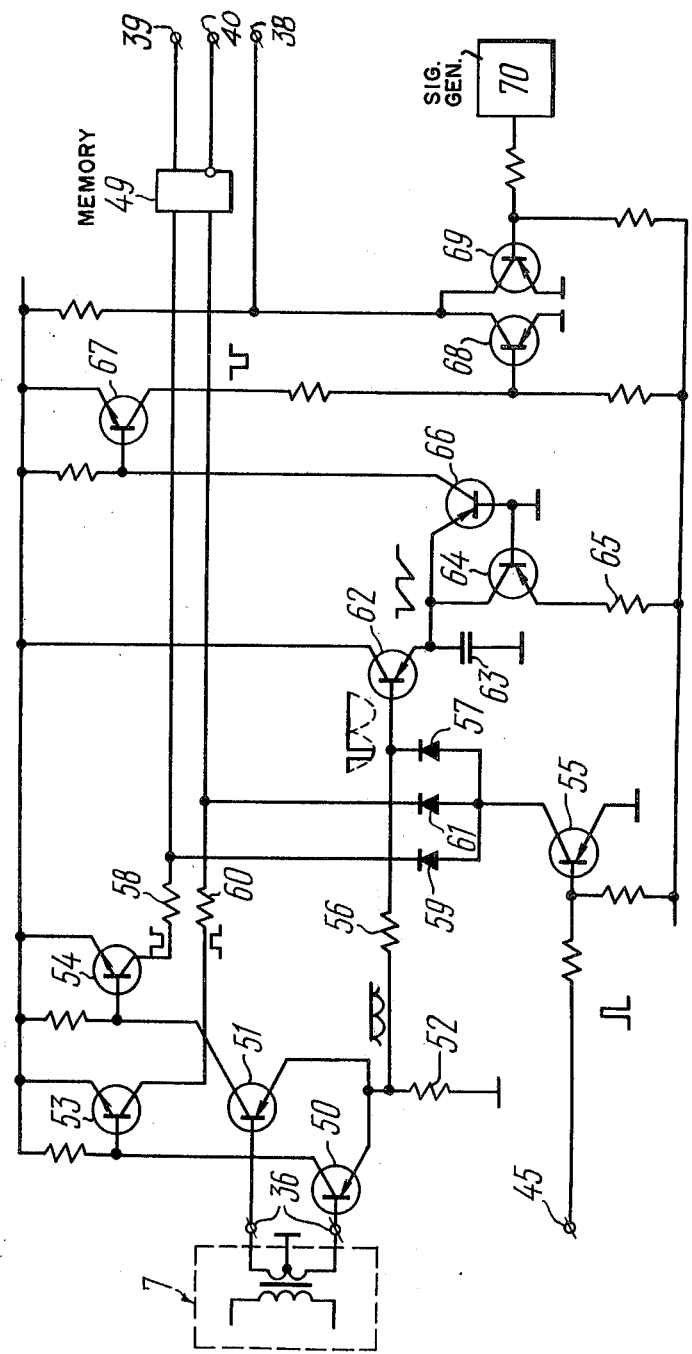
FIG. 2 is a simplified schematic circuit diagram of the converter and of the proportional converter unit, in accordance with the invention.

A simplified circuit diagram of a part of the photo-copying device is shown in FIG. 2. The unidirectional pulse shaper (e.g., shaper 42 in FIG. 1) employs emitter followers built around transistors 50 and 51 operating into a common load 52. The square pulse shaper (e.g., shaper 42 in FIG. 1) is made as a current switch using said transistors 50 and 51 and transistor gate followers 53 and 54. The gating input 45 of the converter is formed by the input of an auxiliary transistor gate 55. The gating circuit 43 (FIG. 1) is built around a resistor 56 (FIG. 2) and a diode 57; the gating circuit 46 (FIG. 1) employs a resistor 60 (FIG. 2) and a diode 61.

Except for the memory store 49, all other elements of the circuit are components of the converter unit 48 (FIG. 1) which converts short pulse amplitudes into a proportional number of higher-frequency pulses delivered during each scanning period.

The converter unit 48 contains an assembly serving to convert the amplitude of a short pulse into an auxiliary pulse length. In its turn, the converter assembly comprises a charging gate using a transistor 62 for charging a timing capacitor 63, a current stabilizing stage built around a transistor 64 and a resistor 65, an output gate employing transistors 66 and 67, a coincidence circuit built around transistors 68 and 69, and a generator 70 producing signals at a frequency higher than that of the reference signal.

Figure 3:
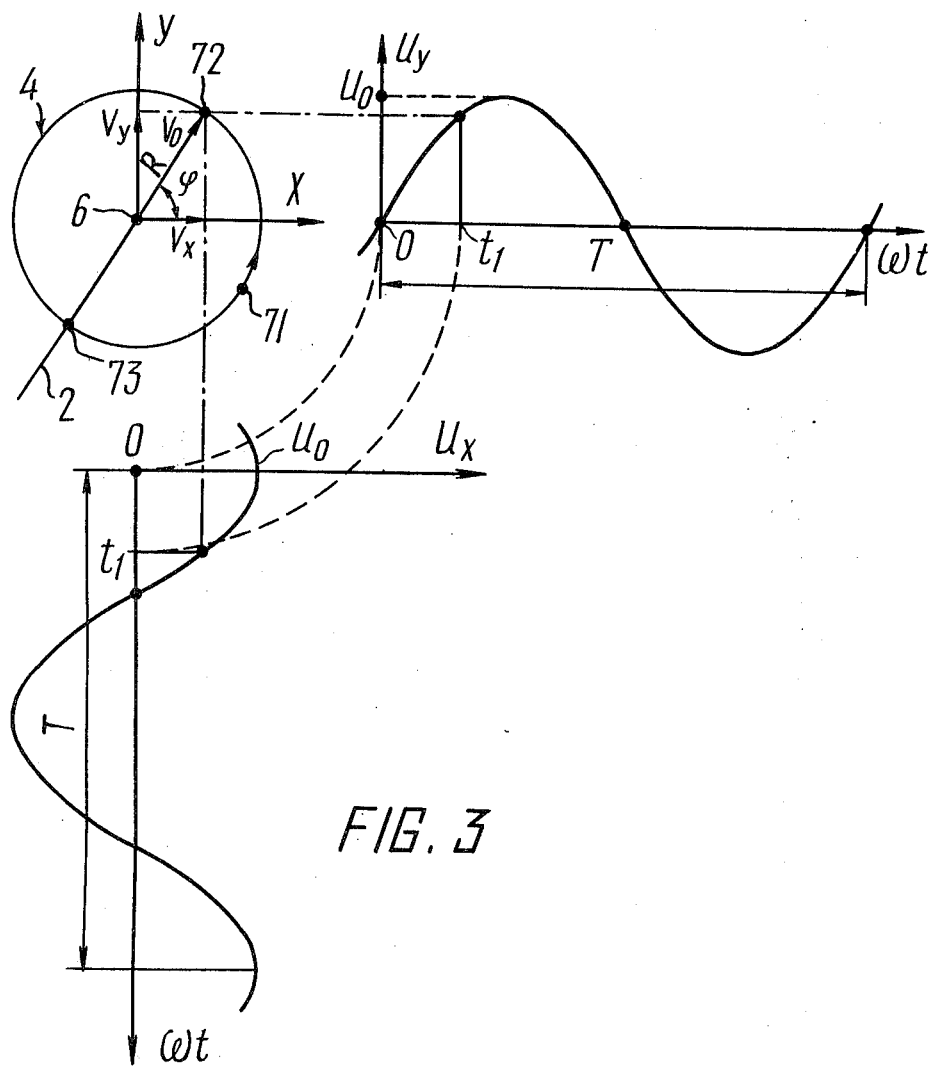
FIG. 3 illustrates scanning of the contour line being copied and generation of the instantaneous values of the reference signal, in accordance with the invention.

FIG. 3 illustrates scanning of the contour line being copied and formation of the instantaneous values of the reference signal. The scanning beam 5 intersects the plane of the contour 3 at a point 71. The path 4 of the point 71 and the line 2 being copied intersect at two points 72 and 73.

The photo-copying device operates as follows.

The scanning beam 5 moving along the path 4 is represented by the point 71 which moves at a uniform angular speed $\omega$, for example, in a counter-clockwise direction. The movement of the point 71 along the path 4 is simultaneous and in phase with voltages $U_x$ and $U_y$ carried by the lines 9 and 8 (FIG. 1) at the outputs of the reference signal source 7.

The initial phase of the voltage $U_y$ corresponds to the point 71 positioned on the positive axis 4 in the Cartesian coordinates. For simplification, a radius R of the circumference is assumed to be numerically equal to a peak value $U_o$ of the voltages $U_x$ and $U_y$.

While moving along the circular path 4, the point 71 intersects the line 2 being followed at the point 72 and 73 lying opposite to each other with respect to the center 6. The photoelectric transducer 1 gives out a short pulse as soon as the point 71 takes up the position of the point 72 or the point 73, depending on the predetermined follow-up direction which may be arbitrary. FIG. 3 shows an example of following the line 2 in the direction of the point 72.

A speed vector $V_o$ of the displacement of the photoelectric transducer 1 along the contour line being traced is directed from the center 6 toward the point 72. Here, the vector $V_o$ and the scanning orbit radius R are also assumed to be numerically equal for simplification purposes.

For moving the center 6 along the vector $V_o$, the centre 6 must move along the X and Y axes as determined by the vectors $V_x$ and $V_y$.

From FIG. 3 it is obvious that if the above assumptions are made, $V_x = U_o \cos \phi = U_o \cos\omega t_i$
$V_y = U_o \sin \phi = U_o \sin\omega t_i$, or in other words, the coordinate components of the photoelectric tranducer speed vector $V_o$ are numerically equal to the instantaneous values of the voltages $U_x$ and $U_y$ generated at the instants when the scanning beam 5 intersects the line 2 being copied in the follow-up direction. In the general case, the coordinate components $V_x$ and $V_y$ of the velocity vector $V_o$ of the speed at which the photoelectric transducer 1 moves along the line 2 are proportional to the above instantaneous values of the voltages $U_x$ and $U_y$ of the reference signal.

The displacement of the photoelectric transducer along the line 2 being copied is effected in the following way.

At a time instant $t_1$ when the scanning beam 5 intersects the line being copied (the point 72 on the orbit 4) a short pulse is applied from the output of the photoelectric transducer 1 to the second input 37, and the converters 34 and 35 convert the instantaneous voltages of the reference signals into a proportional number of higher-frequency pulses which appear at the frequency outputs 38 of the converters 34 and 35 during the scanning period T, and into a logic symbol defining the direction of displacement along the X and Y axes which persists across one of the outputs 39 or 40 during the scanning period T.

Under the action of these signals delivered to the frequency inputs 19 of the drives 11 and 13 and to one of the sign inputs 20 or 21 of these drives, the logical units 17 and 18 generate current pulses actuating the electric motors 15 and 16, and, as result, the step motors move the photoelectric transducer 1 along the guides 12 and 14 in the direction of the X and Y axes in equal steps the number of which equals to the number of pulses applied to the frequency inputs 19.

The same outputs of the converters 34 and 35 are sent to the inputs 29 and 30 (or 31) of the drives 22 and 25; the control units 28 of these drives actuate the motors 27 and thereby move the working member 23 in the direction of the X and Y axes of the machine along the guides 24 and 27. It should be mentioned that the guides 12 and 14 for moving the photoelectric transducer 1 may assume any arbitrary spatial position with respect to the guides 24 and 26 along which the control element 23 moves.

The drives 22 and 25 displace the working member 23 with a preset proportionality factor relative to similar displacement of the photoelectric transducer 1 which provides a required scale of the contour of the blank 32 cut out of the metal sheet 33 with respect to the same contour 3 being copied.

The converter 34 (35) functions as follows:

A sine voltage $U_x$ ($U_y$) is delivered to the inputs of the shapers 41 and 42.

Figure 4:
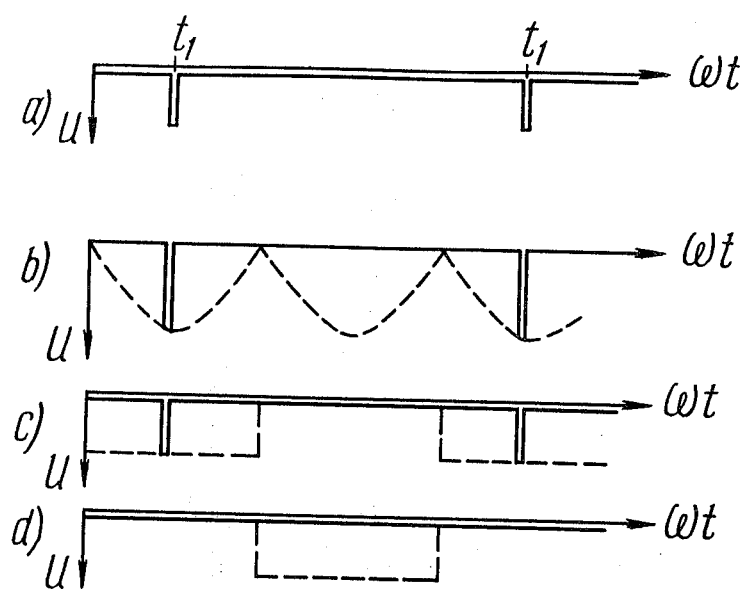
FIG. 4 shows time charts of voltages illustrating operation of the converter of FIG. 1, in accordance with the invention.

The voltage chart across the output of the shaper 41 represents rectified sine voltage half-waves (FIG. 4a); the inverted outputs of the shaper 42 carry square pulses (FIG. 4b and FIG. 4c) of a length equal to the length of the rectified half-waves of FIG. 4a.

The choice of pulse polarity is guided by secondary design considerations.

At time instants $t_1$ when the scanning beam 5 intersects the line 2 being copied at the point 72 the gating inputs 45 of the gating circuits 43, 46 and 47 receive short pulses (FIG. 4a).

During the action of each short pulse applied to the gating inputs 45 (FIG. 4a), the outputs of the gating circuits 43, 46 and 47 produce short pulses (FIGS. 4b, 4c and 4d) with an amplitude depending on the voltage across the inputs of said gating circuits at this particular time moment.

Thus, the amplitude of a short output pulse of the gating circuit 43 which is produced once during the scanning period corresponds to the instantaneous values of the reference signal described above.

At the same time a short pulse (FIG. 4c) appears across the output of the gating circuit 47 and drives the memory store 49 to a respective state.

It has been found that a logic unity appearing at any output of the memory store 49 is associated with an appropriate sign of the coordinate component $V_x$ and $V_y$ of the vector $V_o$.

If at the time instant $t_1$ the other half-wave is produced (FIG. 4b), i.e., the pulse has the waveform shown in FIG. 4d, a short pulse appears at the output of the gating circuit 46 and the memory store 49 reverses its state reversing thereby the sign of the coordinate component $V_x(V_y)$ of the vector $V_o$.

As an angle $\phi$ (FIG. 3) between the line 2 being copied and the X axis changes, the time instants $t_1$ shift with respect to the voltage half-waves (FIG. 4b) and, therefore, the amplitude of the short pulse (FIG. 4b) at the output of the gating circuit 43 changes continuously defining the scalar magnitude of the vector $V_x$ ($V_y$).

The converter unit 48 effects direct conversion of the output amplitudes of the gating circuit 43 into a proportional number of higher-frequency pulses which determine the number of equal steps of the drives 11 and 22 (13 and 26) during the scanning period and thereby define the coordinate component of the speed $V_x$ at which the photoelectric transducer 1 moves as well as a similar coordinate component of the working member speed.

Similar to other converter units, the converter unit 48 may have different design embodiments.

Operation of the embodiment of the converter presented in FIG. 2 is considered below.

The reference voltage from the output of the reference signal source 7 which has a transformer output symmetrical with respect to zero is applied to the inputs of the emitter followers using the transistors 50 and 51. Due to both emitter followers operating into the common load 52, their emitter junctions form a full-wave rectifier producing the output voltage of the shape illustrated in FIG. 4b.

Depending on a half-wave of the alternating reference voltage, current passes either through the transistor 50 or transistor 51 and, respectively, through the emitter junctions of the follower gates 53 and 54, alternatively triggering their transistors into conduction. The waveform of voltage across the collectors of the emitter followers is shown in dash lines in FIG. 4c and 4d, respectively.

When the scanning beam intersects the line being copied, short positive pulses are applied from the photoelectric transducer 1 (FIG. 1) to the input 45 of the transistor gate 55. As soon as this pulse is applied, the transistor of the gate 55 ceases to conduct, the instantaneous voltage (FIG. 56) carried at this particular moment by the emitters of the emitter followers 50 and 51 comes through the resistor 56 to the input of the charging gate transistor 62, and the timing capacitor 63 is charged up to the value of this voltage. Simultaneously, a short pulse determining the direction of the displacement (FIG. 4c) is delivered to one of the inputs of the memory store 49, depending on what follower (53 or 54) is conducting.

Figure 5:
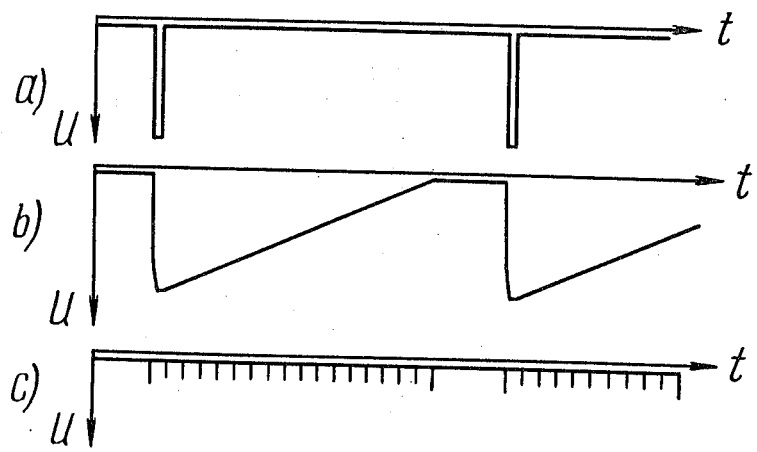
FIG. 5 shows time charts of voltages illustrating operation of the device of FIG. 2, in accordance with the invention.

Before the next pulse comes to the input of the gate 55, the timing capacitor 63 discharges at a constant speed (FIG. 5b). The constant discharge speed is determined by the constant current of the stabilizing stage using the transistor 64 and the resistor 65.

While said capacitor 63 is under negative voltage (FIG. 5), the transistor 66 is cut off. The transistors 67 and 68 are also cut off and the pulses (FIG. 4c) from the generator 70 are delivered via the transistor 69 to the frequency output 38 of the converter 34.

After the timing capacitor 63 has discharged, the transistors 66, 67 and 68 begin to conduct as a result of which the output 38 is shunted by the conducting transistor 69 and pulses from the generator 70 cannot pass to the output 38.

Thus, the number of pulses furnished to the output 38 is proportional to the discharge time of the timing capacitor 63, the discharge time, in its turn, being proportional to the amplitude of the pulse appearing at the input of the transistor 62, whereas the short cathode pulses of the diodes 59 or 61 drive to a respective state the memory store 49 whose outputs are the sign outputs of the converter.

The above process is repeated in the circuit each time a short pulse is applied from the output of the photoelectric transducer 1.

What is claimed is:

1. A photo-copying device for regulating the displacement of the working member of a metal gas-cutting machine according to a contour being copied, said device comprising: a photoelectric transducer for the circular scanning of the line of the contour being copied by means of an optical scanning beam for the detection of points of intersection of said beam with said contour line; the path of said beam at the contour being a circumference of a circle a center lying at least approximately on the contour line being copied; said optical scanning beam moving along said path at a constant angular speed and intersecting said contour line at two points; the output signal of said photoelectric transducer during one scanning period being a short pulse generated when the contour line being copied is intersected at one of said points;

mutually perpendicular guides for guiding displacement of said transducer;

a reference signal source having two outputs at which are produced two reference signals in the form of sine and cosine voltages synchronized with said angular speed of movement of said scanning beam along said circumference, the initial phase of said sine voltage corresponding to the position of said scanning beam at the intercept of said scanning orbit with a positive X half-axis in a Cartesian coordinate system wherein the origin coincides with said center of said circumference, and whereof the X and Y axes run parallel to the mutually perpendicular guides for displacement of said photoelectric transducer along said line being copied; the initial phase of said cosine voltage corresponding to the position of said scanning beam on the positive Y half axis of said Cartesian coordinate system;

said reference signals defining the coordinate components of the speed vector in displacement of said photoelectric transducer along said line being copied, the speed vector being directed from said center of the circumference toward the intercept of said beam with said line being copied;

a first drive adapted to move said photoelectric transducer in said guides along the X axis;

a second drive adapted to move said photoelectric transducer in said guides along the Y axis;

machine guides for said working member;

a third drive for shifting said working member along the machine guides corresponding to the X axis;

a fourth drive for shifting said working member along the machine guides corresponding to the Y axis, and running perpendicular to said guides corresponding to the X axis;

said third and fourth drives moving said working member along said guides of the machine with a predetermined proportionality factor with respect to similar displacement of said photoelectric transducer along said X and Y axes for obtaining a scale between the contour of a blank being cut out of a metal sheet by said working member and the contour being copied;

a first converter for converting the instantaneous values of said cosine voltage of the reference signal, corresponding to the intercepts of said scanning optical beam with said line being copied, into a number of pulses delivered during each period of said circular scanning which determine the number of equal steps through which said first drive moves during each circular scanning period and define the scalar magnitude of said coordinate component in the speed vector of the displacement of said photoelectric transducer along the X axis, and also into a logic symbol defining the direction of displacement of said photoelectric transducer along said X axis, said first converter having a first input which is connected to one of the outputs of said reference signal source and which receives a cosine voltage therefrom, a second input coupled to the output of said photoelectric transducer, a frequency output giving out said pulses whose number during the circular scanning period is proportional to said instantaneous value of said cosine voltage, and two sign outputs a logic unity at one of which determines one of the two directions of displacement of the photoelectric transducer along the X axis;

a second converter for converting the instantaneous values of said sine voltage generated at time moments when said scanning optical beam intersects said line being copied, into a number of pulses following during each period of said circular scanning which determine the number of equal steps made by the second drive during each circular scanning period and define the scalar magnitude of said coordinate component in the speed vector of the displacement of said photoelectric transducer along the Y axis, and also into a logic symbol designating the direction of movement of said photoelectric transducer along the Y axis;

said second converter having a first input which is connected to another of the outputs of said reference voltage source and which receives a sine voltage therefrom, a second input coupled to the output of said photoelectric transducer, a frequency output producing said pulses which determine the number of equal steps of said second drive and whose number during the circular scanning period is proportional to said instantaneous value of said sine voltage, and two sign outputs a logic unity at one of which determines one of the two directions of displacement of said photoelectric transducer along the Y axis;

each of said drives having a frequency input and two sign inputs;

said frequency output of the second converter being connected to said frequency inputs of the second and fourth drives;

said sign outputs of the second converter being connected to said sign inputs of the second and fourth drives; each of said converters comprising:

a first shaper of unidirectional pulses in the form of rectified half-waves of said reference signal, having an input and an output;

a second shaper of square pulses corresponding to the polarity of the half-wave voltages of said reference signal, having two inverted outputs;

the inputs of said first and second shapers being interconnected to form said first converter input;

a first gating circuit which has a signal input connected to said output of the first shaper, a gating input and an output; short pulses appearing at said output of the first gating circuit corresponding to the scalar magnitudes of said instantaneous values of the reference signal;

a second gating curcuit having a signal input connected to one of said inverted outputs of the second shaper, a gating input and an output;

a third gating circuit provided with a signal input coupled to the other said inverted output of the second shaper, a gating input and an output;

said gating inputs of the first, second and third gating circuits being interconnected to form said second input of the converter;

short pulses produced across any output of said second or third gating circuit defining the sign of said instantaneous values of the reference signal;

a converter unit for converting the amplitudes of said output short pulses from said first gating circuit into a proportional number of pulses following at a frequency higher than the frequency of the reference signal; said unit having an input connected to said output of the first gating circuit and an output forming said frequency output of the converter; a memory store which has a unity input and a zero input; said zero input being connected to said output of the second gating circuit, said unity input being connected to said output of the third gating circuit, said zero and unity outputs forming said sign outputs of the converter.

* * * * *